(12) United States Patent
Yang

(10) Patent No.: US 8,575,848 B2
(45) Date of Patent: Nov. 5, 2013

(54) VOLTAGE-LIMITING AND REVERSE POLARITY SERIES TYPE LED DEVICE

(76) Inventor: Tai-Her Yang, Dzan-Hwa (TW)

( * ) Notice: Subject to any disclaimer, the term of this patent is extended or adjusted under 35 U.S.C. 154(b) by 261 days.

(21) Appl. No.: 12/958,448

(22) Filed: Dec. 2, 2010

(65) Prior Publication Data

US 2011/0266963 A1 Nov. 3, 2011

Related U.S. Application Data

(63) Continuation-in-part of application No. 12/630,902, filed on Dec. 4, 2009, now abandoned, and a continuation-in-part of application No. 12/648,345, filed on Dec. 29, 2009, now Pat. No. 8,415,892.

(51) Int. Cl.
*H05B 37/00* (2006.01)
(52) U.S. Cl.
USPC ........ 315/192; 315/185 R; 315/191; 315/193; 315/185 S

(58) Field of Classification Search
USPC .................. 315/291, 297, 299, 312
See application file for complete search history.

(56) References Cited

U.S. PATENT DOCUMENTS

| | | | | |
|---|---|---|---|---|
| 7,066,628 | B2 * | 6/2006 | Allen | 362/267 |
| 7,293,896 | B2 * | 11/2007 | Cheung | 362/612 |
| 2002/0043943 | A1 * | 4/2002 | Menzer et al. | 315/291 |
| 2006/0103320 | A1 * | 5/2006 | Janning | 315/164 |

* cited by examiner

*Primary Examiner* — Douglas W Owens
*Assistant Examiner* — Jonathan Cooper
(74) *Attorney, Agent, or Firm* — Bacon & Thomas, PLLC

(57) ABSTRACT

The present invention provides LEDs and zener diodes that are homo-polar and connected in parallel to constitute the first set of LED and zener diode and a second set of LED and zener diode; the first LED and zener diode set and the second LED and zener diode assume a reverse polarity series connection to constitute the voltage-limiting and reverse polarity series type LED device; through the selection of connecting pins, it is used on direct current power source or alternating current power source which is its characteristics.

16 Claims, 5 Drawing Sheets

VOLTAGE-LIMITING AND REVERSE POLARITY SERIES TYPE LED DEVICE

CROSS-REFERENCE TO RELATED APPLICATION

This application is a Continuation-In-Part of application Ser. No. 12/648,345 filed on Dec. 29, 2009, which is a Continuation-In Part of application Ser. No. 12/630,902 filed on Dec. 4, 2009.

BACKGROUND OF THE INVENTION (a) Field of the Invention

The present invention relates to a voltage-limiting and reverse polarity series type LED device composed of zener diodes and LEDs, and through a selection of connecting pins, is usable on direct current power or alternating current power as its characteristics.

(b) Description of the Prior Art

Currently LEDs are divided into the direct current electric energy drive LED or the alternating current LED which is driven by alternating current through reverse polarity parallel connection of LEDs. Their usages are relatively inflexible. Moreover, when the alternating current drives the alternating current LED, the working time of the individual reverse-poled parallel-connected LED are reduced to half which accounts for its shortcoming.

SUMMARY OF THE INVENTION

The present invention of a voltage-limiting and reverse polarity series type LED device is constituted of zener diodes and LEDs. It parallel-connects at least one or more LEDs in homo-polar parallel, series, or parallel-series connection and zener diodes of the same working polarity to constitute the first LED and zener diode set, and parallel-connects another set constituting by at least one or more LEDs in homo-polar parallel, series, or parallel-series connection and zener diodes of the same working polarity to constitute the second LED and zener diode set. Through the reverse-polarity series connection of the first LED and zener diode set and the second LED and zener diode set, a voltage-limiting and reverse polarity series type LED device is formed.

Moreover, in practical applications, the voltage-limiting and reverse polarity series type LED device can further connect the drive circuit constituted by the current-limiting impedance and/or the electricity storing and discharging device to produce the required operational characteristics.

DESCRIPTION OF MAIN COMPONENT SYMBOLS (101)(102): LED
(203)(204): Diodes
(301)(302): Electricity storing and discharging device
(400)(401)(402): Current-limiting impedance elements
(501)(502) Zener diodes
(601)(602): Diodes
Terminal (a): First LED and zener diode set connection terminal
Terminal (b): First LED and zener diode set and second LED and zener diode set reverse polarity series connection terminal
Terminal (c): Second LED and zener diode set connection terminal

DETAILED DESCRIPTION OF THE PREFERRED EMBODIMENTS

The LED referred to in the present invention is the abbreviation of light-emitting diode.

Currently LEDs are divided into the direct current electric energy drive LED or the alternating current LED which is driven by alternating current through reverse polarity parallel connection of LEDs. Their usages are relatively inflexible. Moreover, when the alternating current drives the alternating current LED, the working time of the individual reverse-poled parallel-connected LED are reduced to half which accounts for its shortcoming.

The present invention provides a voltage-limiting and reverse polarity series type LED device and that, through a selection of pins, is usable on direct current power or alternating current power for the convenience of users.

The present invention of a voltage-limiting and reverse polarity series type LED device is constituted of zener diodes and LEDs. It parallel-connects at least one or more homopolar parallel-connected or series-connected or series and parallel-connected LEDs and zener diodes of the same working polarity to constitute the first LED and zener diode set, and parallel connects another set constituting by at least one or more homo-polar parallel-connected or series-connected or parallel and series-connected LEDs and zener diodes of the same working polarity to constitute the second LED and zener diode set. Through the reverse-polarity series connection of the first LED and zener diode set and the second LED and zener diode set, a voltage-limiting and reverse polarity series type LED device is formed.

Moreover, in practical applications, the voltage-limiting and reverse polarity series type LED device can further connect the drive circuit constituted by the current-limiting impedance and/or the electricity storing and discharging device to produce the required operational characteristics.

Figure 1:
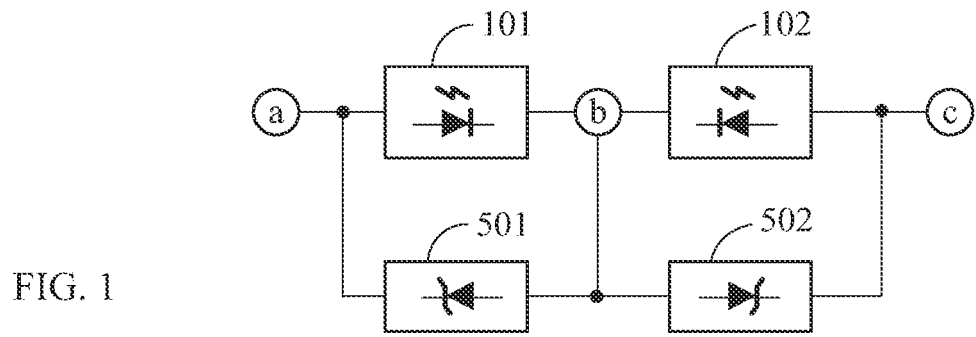
FIG. 1 is the circuit diagram of the voltage-limiting and reverse polarity series type LED device of the present invention.

The following are the main components of the voltage-limiting and reverse polarity series type LED device of the present invention:

FIG. 1 is the circuit diagram of the voltage-limiting and reverse polarity series type LED device of the present invention.

The main components in FIG. 1 include:

LED (101): Composed of one or more homo-polar parallel-connected or series-connected or series and parallel-connected light-emitting diodes.

LED (102): Composed of one or more homo-polar parallel-connected or series-connected or series and parallel-connected light-emitting diodes.

Zener diodes (501), (502): Composed of one or more zener diodes or circuit devices of the same function, and during multiple installations, zener diodes are connected in parallel or in series or in series and parallel.

LED (101) and zener diode (501) of the same working polarity are connected in parallel to constitute the first LED and zener diode set; LED (102) and zener diode (502) of the same working polarity are connected in parallel to constitute the second LED and zener diode set.

The voltage-limiting and reverse polarity series type LED device is constituted by the reverse polarity series connection of the first LED and zener diode set and the second LED and zener diode set.

The method of installation for the external conducting interface of the voltage-limiting and reverse polarity series type LED device includes:

In the voltage-limiting and reverse polarity series type LED device of the present invention, the connection terminal of the first LED and zener diode set is set as the terminal (a) and installed with the conducting interface device, the connection terminal of the first LED and zener diode set and the second LED and zener diode set in reverse polarity series connection is set as the terminal (b) and installed with the conducting interface device, and the connection terminal of the second LED and zener diode set is set as the terminal (c) and installed with the conducting interface device, for application on the alternating current power or the direct current power of alternating polarity or the direct current power;

Moreover, for the voltage-limiting and reverse polarity series type LED device, the connection terminal of the first LED and zener diode set is set as the terminal (a) and installed with the conducting interface device, the connection terminal of the first LED and zener diode set and the second LED and zener diode set in reverse polarity series connection is not installed with the conducting interface device, and the connection terminal of the second LED and zener diode set is set as the terminal (c) and installed with the conducting interface device, for application on the alternating current power or the direct current power of alternating polarity.

Figure 2:
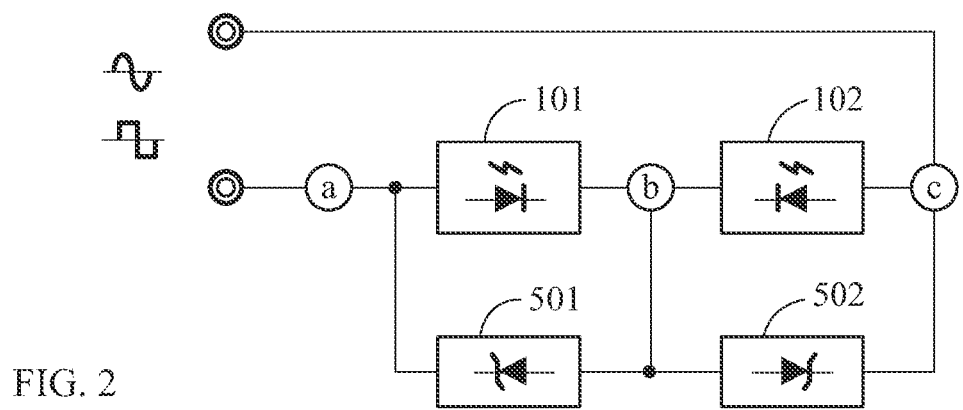
FIG. 2 is the circuit diagram of the voltage-limiting and reverse polarity series type LED device of the present invention as applied on the alternating current power source.
Figure 3:
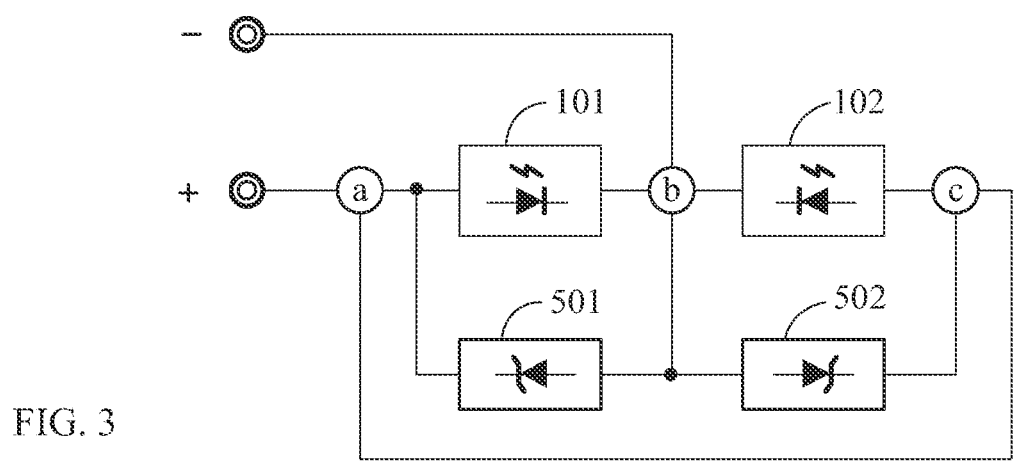
FIG. 3 is the circuit diagram of the voltage-limiting and reverse polarity series type LED device of the present invention as applied on the direct current power source.

When the alternating current power or the direct current power of alternating polarity is delivered from the conducting interface device at the terminal (a) and the conducting interface device at the terminal (c), the voltage-limiting and reverse polarity series type LED device of the present invention is operated as the function of alternating current LED, and during various voltage polarities, the zener diode (501) and the zener diode (502) provide the voltage-limiting protection for the parallel-connected LED (101) and LED (102). When the alternating current power or the direct current power of alternating polarity is at the first polarity status that enables the LED (102) work, it relies on the reverse polarity diode function of the zener diode (501) to pass the electrical current through LED (102); and when the alternating current power or the direct current power of alternating polarity changes to the second polarity (opposite to the first polarity) status, it relies on the reverse polarity diode function of diode (502) to pass the electrical current through LED (101); FIG. 2 is the circuit diagram of the voltage-limiting and reverse polarity series type LED device of the present invention as applied on the alternating current power source, or When the terminal (a) conducting interface device connects with the terminal (c) conducting interface device, their connection terminal and the terminal (b) commonly allow the direct current to pass through LED (101) and LED (102), and the zener diode (501) and zener diode (502) commonly provide voltage-limiting protection for LED (101) and LED (102) to enable the voltage-limiting and reverse polarity series type LED device of the present invention to operate as the direct current LED functions. FIG. 3 is the circuit diagram of the voltage-limiting and reverse polarity series type LED device of the present invention as applied on the direct current power source.

Figure 4:
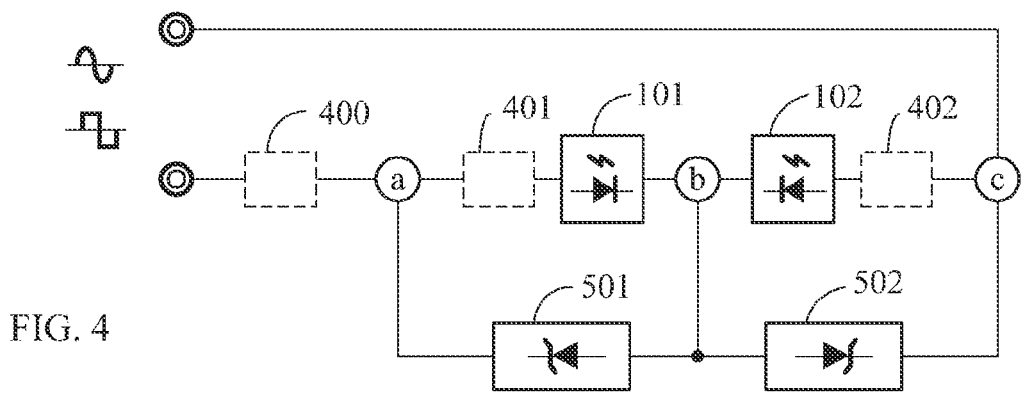
FIG. 4 is the circuit diagram of the voltage-limiting and reverse polarity series type LED device of the present invention as applied on the alternating current power source and connected in series with the impedance elements.

When applied on the alternating current power or the direct current power of alternating polarity, the voltage-limiting and reverse polarity series type LED device of the present invention is series-connected with the current-limiting impedance element (400) between the alternating current power or the direct current power of alternating polarity and the conducting interface device at terminal (a) or the conducting interface device at terminal (c) of the voltage-limiting and reverse polarity series type LED device, and/or connect the current-limiting impedance element (401) in series with LED (101), and/or connect the current-limiting impedance element (402) in series with LED (102);

FIG. 4 is the circuit diagram of the voltage-limiting and reverse polarity series type LED device of the present invention as applied on the alternating current power source and connected in series with the impedance elements;

As shown in FIG. 4, the impedance elements are constituted by one or more impedance elements which include 1) resistive impedance elements; 2) capacitive impedance elements; 3) inductive impedance elements; 4) linear transistor impedance elements; 5) chopped wave switch type elements composed of solid state switch type elements; 6) chopped wave switch type elements composed of thyristors;

The series connection positions of the aforementioned impedance elements include 1) the impedance elements first connect with individual LEDs in series then connect in parallel with the zener diode; and/or 2) the impedance element is series-connected between the power source and the voltage-limiting and reverse polarity series type LED device; and/or 3) the LED and the zener diode first connect in parallel in the same working polarity and then connect in series with the impedance element.

Figure 5:
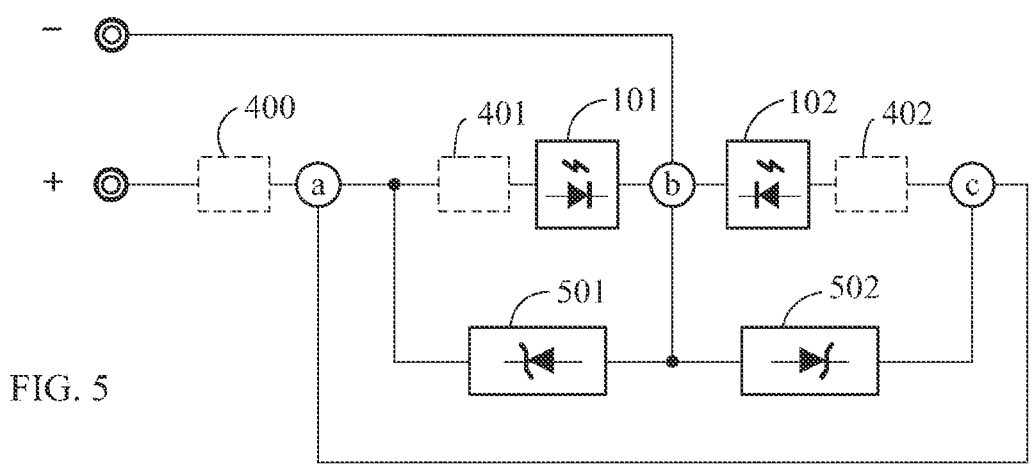
FIG. 5 is the circuit diagram of the voltage-limiting and reverse polarity series type LED device of the present invention as applied on the direct current power source and connected in series with the impedance elements.

When applied on the direct current power, the voltage-limiting and reverse polarity series type LED device of the present invention in order to limit the electrical current passing through the voltage-limiting and reverse polarity series type LED device, it further: 1) connects in series with the current-limiting impedance element (400) between the direct current power source and the connection terminal of terminal (a) conducting interface device and terminal (c) conducting interface device of the voltage-limiting and reverse polarity series type LED device; and/or 2) connects in series with the current-limiting impedance element (400) between the direct current power source and the terminal (b) conducting interface device of the voltage-limiting and reverse polarity series type LED device; and/or 3) connects in series with the current-limiting impedance element (401) with the LED (101) first and then connects in parallel with the zener diode (501); and/or 4) connects in series with the current-limiting impedance element (402) with the LED (102) first and then connects in parallel with the zener diode (502);

FIG. 5 is the circuit diagram of the voltage-limiting and reverse polarity series type LED device of the present invention as applied on the direct current power source and connected in series with the impedance elements;

As shown in FIG. 5, the impedance elements are constituted by one or more impedance elements which include 1) resistive impedance elements; 2) linear transistor impedance elements; 3) chopped wave switch type elements composed of solid state switch type elements; 4) chopped wave switch type elements composed of thyristors;

The series connection positions of the aforementioned impedance elements include 1) the impedance elements first connect with individual LEDs in series then connect in parallel with the zener diode; and/or 2) the impedance element is series-connected between the power source and the reverse polarity series connection type LED; and/or 3) the LED and the zener diode first connect in parallel in the same working polarity and then connect in series with the impedance element.

Figure 6:
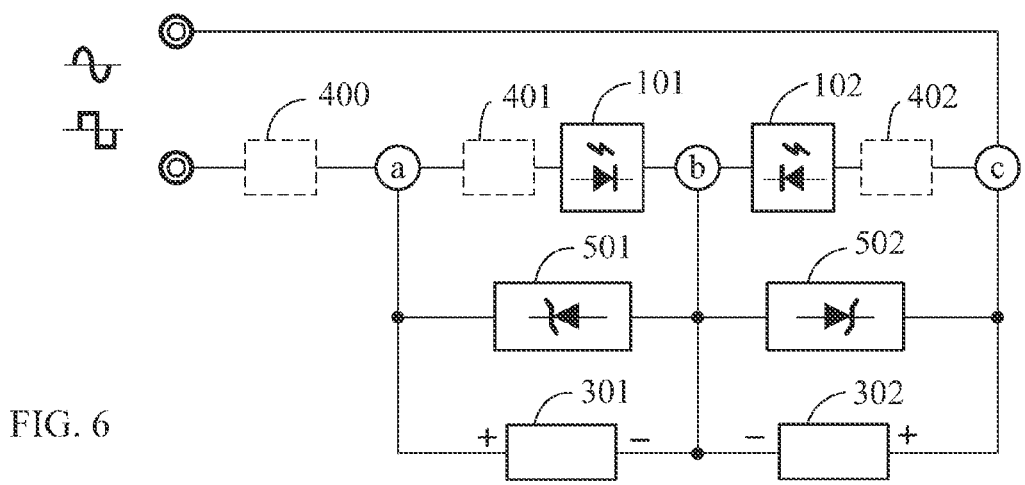
FIG. 6 is the circuit diagram of the present invention wherein the LEDs are connected in series with the current-limiting impedance elements as well as connected in parallel with the power storing and discharging devices, and connected in parallel with the zener diodes.

When applied on the alternating current power, the voltage-limiting and reverse polarity series type LED device of the present invention further connects in series with a current-limiting impedance element (400) between the alternating current power source and the terminal (a) and/or the terminal (c) of the reverse polarity series connection type LED, and/or a current-limiting impedance element (401) is connected in series with LED (101), and/or a current-limiting impedance element (402) is connected in series with LED (102); the zener diode (501) is connected in parallel between terminal (a) and terminal (b), the zener diode (502) is connected in parallel between terminal (b) and terminal (c), and both terminals of the zener diode (501) are connected in parallel with the electricity storing and discharging device (301) and/or both terminals of the zener diode (502) are connected in parallel with the electricity storing and discharging device (302), and during the delivery of the alternating current power, when the polarity of the supplied alternating current power source is at the power supply status to the parallel-connected LED, and the power supply voltage is higher than the voltage of its parallel-connected electricity storing and discharging device, the power source simultaneously supplies power to the LED and charges the parallel-connected electricity storing and discharging device; while the polarity of the alternating current power source is at the status of not supplying power to the parallel-connected LED or when the power supply voltage is lower than the voltage of the electricity storing and discharging device, the electricity storing and discharging device supplies power to the parallel-connected LED;

By means of the operation of the electricity storing and discharging device, the following partial or complete functions are attained: 1) enables two LEDs to deliver power and emit light without being affected by the polarity changes of the alternating current power source; 2) when the alternating current power source drives the LED, optical pulsation of the LED is reduced; 3) provides the delay electric energy for LED when power is cut off; 4) serves as the power supply to allow continuous lighting of LEDs during an emergency power shutdown. The electricity storing and discharging device is consisted of a rechargeable battery or a mono-polar or bipolar capacitor or super capacitor; FIG. 6 is the circuit diagram of the present invention wherein the LEDs are first connected in series with the current-limiting impedance elements and then connected in parallel with the electricity storing and discharging devices and the zener diodes.

When applied on the alternating current power, the voltage-limiting and reverse polarity series type LED device of the present invention further series connects with a current-limiting impedance element (400) between the alternating current power source and the (a) or (c) terminals of the reverse polarity series connection type LED; and/or the LED (101) series connects with a current-limiting impedance element (401), and series connects with the diode (203) according to the direction of the light-emitting current of LED (101), and then the current input terminal of diode (203) and the current output terminal of LED (101) are parallel connected with the zener diode (501) in the same working current direction to protect LED (101). i.e., the zener diode (501) is parallel connected with the terminal (a) and terminal (b); and/or the LED (102) series connects with a current-limiting impedance element (402), and series connects with the diode (204) according to the direction of light-emitting current of LED (102), and then the current input terminal of diode (204) and the current output terminal of LED (102) are parallel connected with the zener diode (502) in the same working current direction to protect LED (102) i.e., the zener diode (502) is parallel connected with the terminal (b) and terminal (c); and a electricity storing and discharging device (301) is connected in parallel between the connecting terminal of the diode (203) and the current-limiting impedance element (401) and the current output terminal of LED (101), and/or a electricity storing and discharging device (302) is connected in parallel between the connecting terminal of the diode (204) and current-limiting impedance element (402) and the current output terminal of LED (102), and during the delivery of the alternating current power, when the polarity of the supplied alternating current power source is at the power supply status to the parallel-connected LED, and the power supply voltage is higher than the voltage of its parallel-connected electricity storing and discharging device, the power source simultaneously supplies power to the LED and charges the parallel-connected electricity storing and discharging device; while the polarity of the alternating current power source is at the status of not supplying power to the parallel-connected LED or when the power supply voltage is lower than the voltage of the electricity storing and discharging device, the electricity storing and discharging device supplies power to the parallel-connected LED.

By means of the operation of the electricity storing and discharging device, the following partial or complete functions are attained: 1) enables two LEDs to deliver power and emit light without being affected by the polarity changes of the alternating current power source; 2) when the alternating current power source drives the LED, optical pulsation of the LED is reduced; 3) provides the delay electric energy for LED when power is cut off; 4) serves as the power supply to allow continuous lighting of LEDs during an emergency power shutdown. The electricity storing and discharging device is consisted of a rechargeable battery or a mono-polar or bipolar capacitor or super capacitor.

Figure 7:
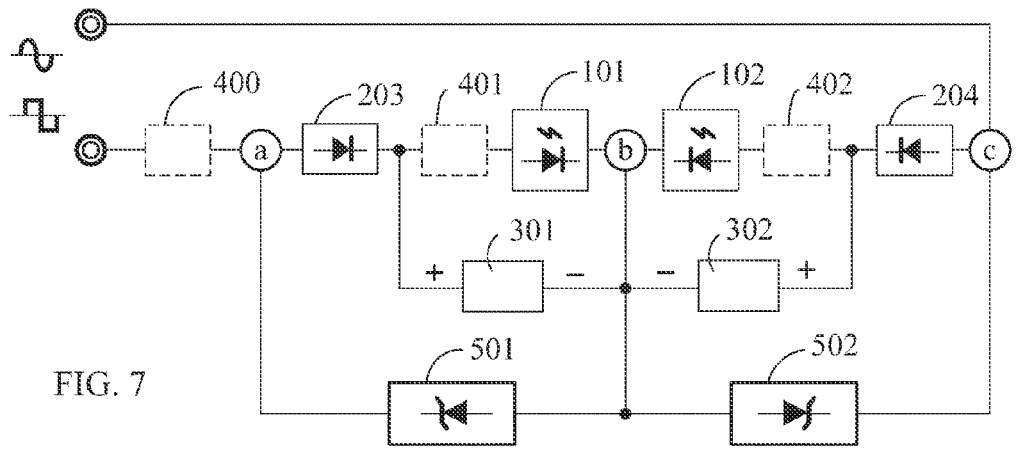
FIG. 7 is the circuit diagram of the present invention in FIG. 6 wherein the LEDs are connected in series with the current-limiting impedance elements then connected in parallel with the power storing and discharging device, then connected in series again with the blocking diodes and finally connected in parallel with the zener diodes.

FIG. 7 is the circuit diagram of the present invention in FIG. 6 wherein the LEDs are connected in series with the current-limiting impedance elements then are connected in parallel with the electricity storing and discharging devices, then are connected in series with blocking diodes, and finally are connected in parallel with zener diodes.

Figure 8:
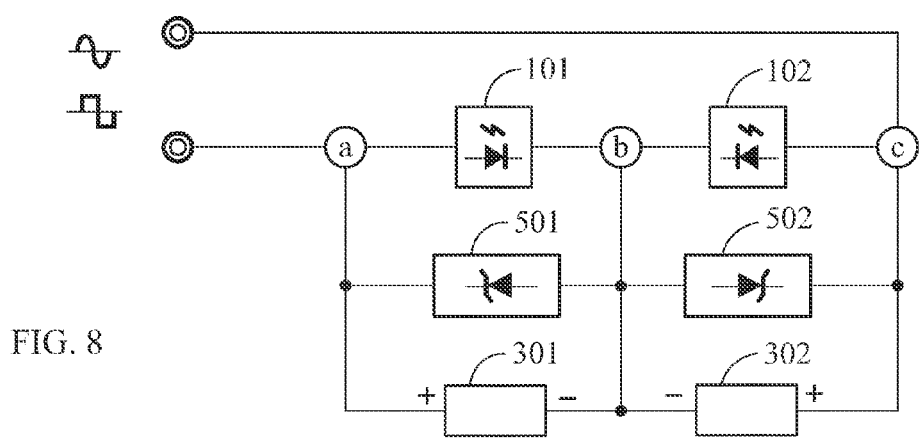
FIG. 8 is the operational circuit diagram of the present invention in FIG. 6 wherein impedance elements are not installed.

In the operational diagrams of FIG. 6 and FIG. 7 wherein the voltage-limiting and reverse polarity series type LED device is applied on alternating current power and connected in parallel with the electricity storing and discharging devices, the current-limiting impedance element (400) and/or the current-limiting impedance elements (401) and/or the current-limiting impedance element (402) can be not installed;

FIG. 8 is the operational circuit diagram of FIG. 6 wherein impedance elements are not installed.

Figure 9:
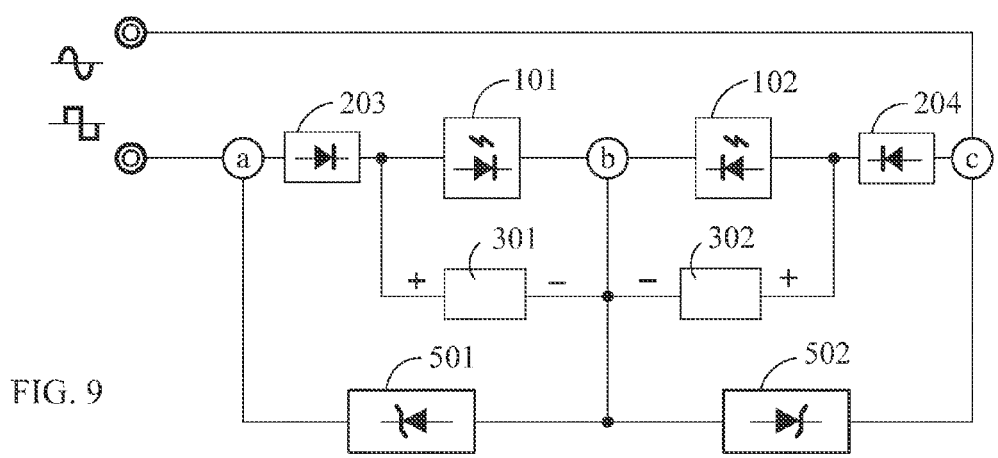
FIG. 9 is the operational circuit diagram of the present invention in FIG. 7 wherein impedance elements are not installed.

FIG. 9 is the operational circuit diagram of FIG. 7 wherein impedance elements are not installed.

Figure 10:
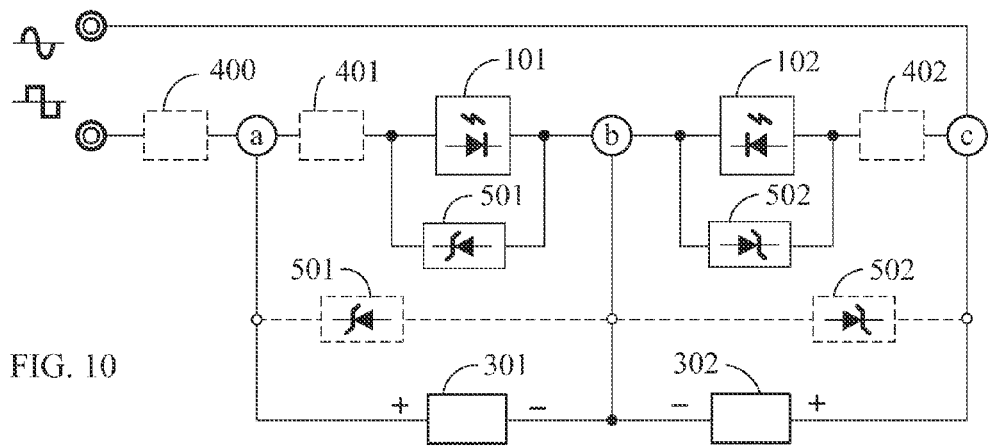
FIG. 10 is the operational circuit diagram illustrating that the LEDs in FIG. 6 are connected in parallel with the zener diodes.

The voltage-limiting and reverse polarity series type LED device of the present invention as applied in the operational circuits of aforementioned FIGS. 6, 7, and 9, wherein the zener diode (501) connected in parallel between terminal (a) and terminal (b) of the voltage-limiting and reverse polarity series type LED device, and/or the zener diode (502) connected in parallel with terminal (b) and terminal (c) of the voltage-limiting and reverse polarity series type LED device can changed to be installed in parallel with LED (101) and/or LED (102), or installed at both locations;

FIG. 10 is the operational circuit diagram illustrating that the LEDs in FIG. 6 are connected in parallel with the zener diodes.

Figure 11:
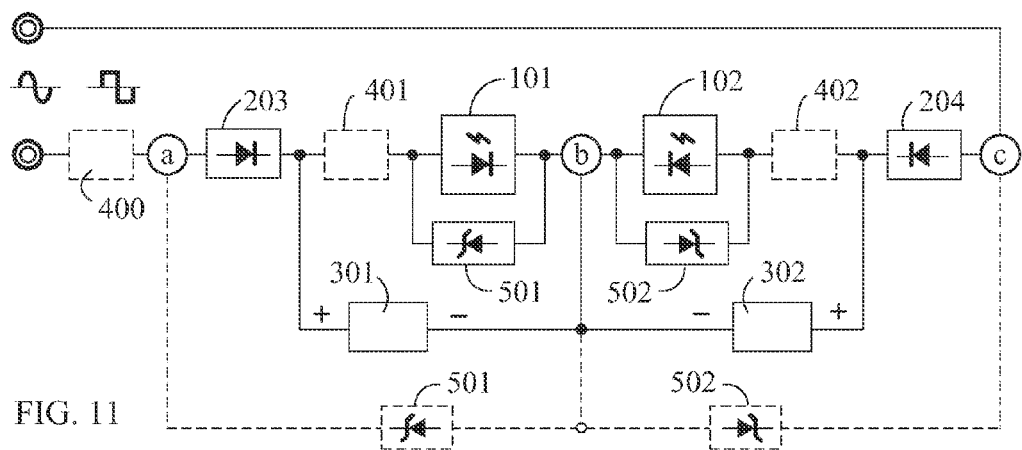
FIG. 11 is the operational circuit diagram illustrating that the LEDs in FIG. 7 are connected in parallel with the zener diodes.

FIG. 11 is the operational circuit diagram illustrating that the LEDs in FIG. 7 are connected in parallel with the zener diodes.

Figure 12:
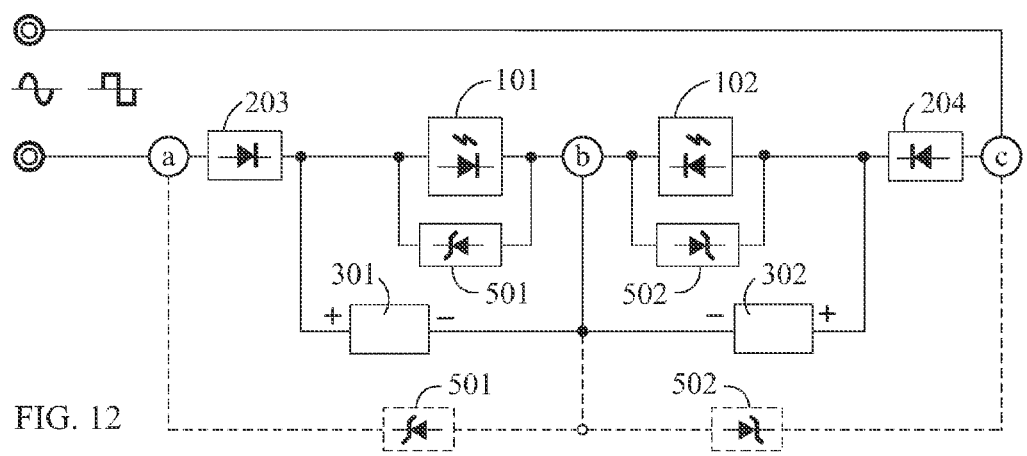
FIG. 12 is the operational circuit diagram illustrating that the LEDs in FIG. 9 are connected in parallel with the zener diodes.

FIG. 12 is the operational circuit diagram illustrating that the LEDs in FIG. 9 are connected in parallel with the zener diodes.

In the voltage-limiting and reverse polarity series type LED device of the present invention, when the LED (101) and the LED (102), the Zener diode (501) and the Zener diode (502) are composed of plural LEDs and Zener diodes being connected in series, or in series and parallel, the forward voltage (VF) of the parallel-connected Zener diodes is also formed in a series-connected state, so when the current of one set of the LEDs passes through the Zener diode parallel-connected to another set of the LEDs, a state of electric loss is formed due to the increasing voltage drop, to solve the problem, the circuit structure of reverse polarity parallel-connected diodes can be established between terminal (a) and terminal (b) and between terminal (b) and terminal (c) in the voltage-limiting and reverse polarity series type LED device, such that when the current of one set of the LEDs passes through the diode parallel-connected to another set of LEDs, the electric loss can be reduced.

Figure 13:
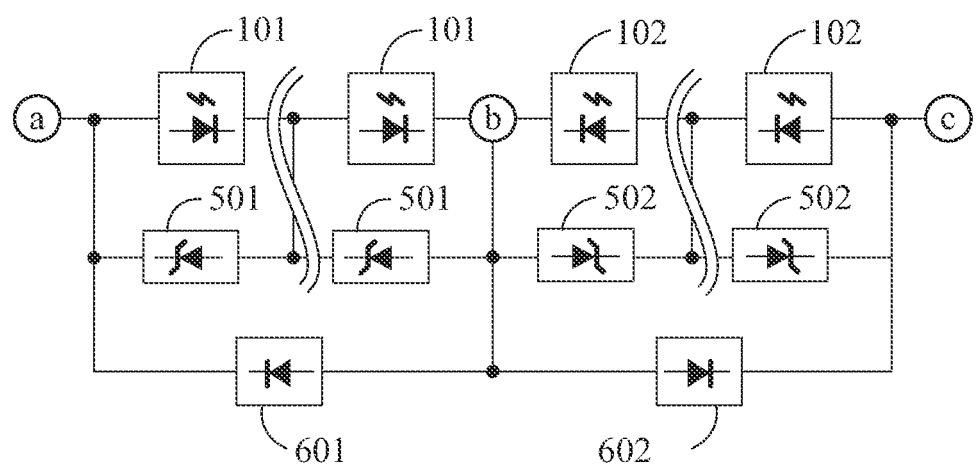
FIG. 13 is the circuit diagram of the voltage-limiting and reverse polarity series type LED device of the present invention wherein the reverse polarity parallel-connected diodes being installed between terminal (a) and terminal (b) and between terminal (b) and terminal (c).

FIG. 13 is the circuit diagram of the voltage-limiting and reverse polarity series type LED device of the present invention wherein the reverse polarity parallel-connected diodes being installed between terminal (a) and terminal (b) and between terminal (b) and terminal (c);

As shown in FIG. 13, it mainly consists of:

LED (101): Composed of one or more homo-polar parallel-connected or series-connected or series and parallel-connected light-emitting diodes.

LED (102): Composed of one or more homo-polar parallel-connected or series-connected or series and parallel-connected light-emitting diodes.

Zener diodes (501), (502): Composed of one or more zener diodes or circuit devices of the same function, and during multiple installations, zener diodes are connected in parallel or in series or in series and parallel.

LED (101) and zener diode (501) of the same working polarity are connected in parallel to constitute the first LED and zener diode set; LED (102) and zener diode (502) of the same working polarity are connected in parallel to constitute the second LED and zener diode set.

The voltage-limiting and reverse polarity series type LED device is constituted by the reverse polarity series connection of the first LED and zener diode set and the second LED and zener diode set.

diode (601, 602): composed of rectifying diodes, wherein the diode (601) is served to be parallel connected in reverse polarity to two ends of the plural series-connected or series-parallel connected LEDs (101), the diode (602) is served to be parallel connected in reverse polarity to two ends of the plural series-connected or series-parallel connected LEDs (102);

the installation of exterior conducting interface device including:

In the voltage-limiting and reverse polarity series type LED device of the present invention, the connection terminal of the first LED and zener diode set is set as the terminal (a) and installed with the conducting interface device, the connection terminal of the first LED and zener diode set and the second LED and zener diode set in reverse polarity series connection is set as the terminal (b) and installed with the conducting interface device, and the connection terminal of the second LED and zener diode set is set as the terminal (c) and installed with the conducting interface device, for application on the alternating current power or the direct current power of alternating polarity or the direct current power.

The zener diode which provides the voltage-limiting protection for the LED of the voltage-limiting and reverse polarity series type LED device of the present invention are replaceable with circuit devices which include semiconducting elements and devices and machine electronics with voltage-limiting effects and reverse polarity conduction.

During practical applications, the following options are available for pertinent elements of the voltage-limiting and reverse polarity series type LED device of the present invention:

1) The specifications for the power, voltages, currents and numbers as well as the series or parallel or series-parallel connections of LED (101) and LED (102) are the same with or different from each other;

2) The colors of lights emitted by the energized LED (101) and LED (102) are the same with or different from each other;

3) The types and specifications of the current-limiting element (400) and/or current-limiting element (401) and/or current-limiting element (402) are the same with or different from each other;

4) The current-limiting impedance element (400) and/or the current-limiting impedance element (401) and/or the current-limiting impedance (402) are fixed impedances and adjustable impedance values or chopper controlled or linear controlled in order to control. LED light adjustments. This includes simultaneous or separate control of LED (101) and LED (102);
5) The types and specifications of the electricity storing and discharging device (301) and/or the electricity storing and discharging device (302) are the same with or different from each other;
6) The types and specifications of the zener diode (501) and the zener diode (502) are the same with or different from each other.

In the practical applications, the frequently-used structural modes of the voltage-limiting and reverse polarity series type LED device of the present invention are include:
1) The individual elements that constitute the voltage-limiting and reverse polarity series type LED device are independent structures, and the external connections and individual elements rely on conducting interface devices such as conduction terminals, and/or conducting wire, and/or electrical conductors, and/or plugs, and/or sockets to connect or solder or lock for connections; and/or
2) Two or more individual elements form an integrated package and conducting interface devices are installed, and the external connections and individual elements of other parts rely on conducting interface devices such as conduction terminals, and/or conducting wire, and/or electrical conductors, and/or plugs, and/or sockets to connect or solder or lock for connections; and/or
3) The first LED and zener diode set is an integrated package and conducting interface devices are installed, and the second LED and zener diode set is an integrated package and conducting interface devices are installed. Between them, conducting interface devices such as conduction terminals, and/or conducting wire, and/or electrical conductors, and/or plugs, and/or sockets make connections or solder or lock for connections; and/or
4) The whole voltage-limiting and reverse polarity series type LED device is integrated into a single package, and conducting interface devices such as conduction terminals, and/or conducting wire, and/or electrical conductors, and/or plugs, and/or sockets are installed to make external connections or methods such as soldering or locking are used for external connections.

In practical applications, the formation of hardware structures between the voltage-limiting and reverse polarity series type LED device and its peripheral devices or circuit elements can be configured to requirements under the principle of invariable circuit.

The invention claimed is:

1. A voltage-limiting and reverse polarity series type LED device that parallel-connects one or more unipolar parallel-connected or series-connected or series and parallel-connected LEDs and zener diodes of the same working polarity to constitute the first LED and zener diode set, and parallel connects another set constituting by at least one or more unipolar parallel-connected or series-connected or parallel and series-connected LEDs and zener diodes of the same working polarity to constitute the second LED and zener diode set; wherein through the reverse-polarity series connection of the first LED and zener diode set and the second LED and zener diode set, a voltage-limiting and reverse polarity series type LED device is formed, said voltage-limiting and reverse polarity series type LED device comprising:
LED (101): composed of one or more unipolar parallel-connected or series-connected or series and parallel-connected light-emitting diodes;
LED (102): composed of one or more unipolar parallel-connected or series-connected or series and parallel-connected light-emitting diodes;
zener diodes (501), (502): composed of one or more zener diodes or circuit devices of the same function that, during multiple installations, are connected in parallel or in series or in series and parallel, wherein:
LED (101) and zener diode (501) of the same working polarity are connected in parallel to constitute the first LED and zener diode set;
LED (102) and zener diode (502) of the same working polarity are connected in parallel to constitute the second LED and zener diode set;
the voltage-limiting and reverse polarity series type LED device is constituted by the reverse polarity series connection of the first LED and zener diode set with the second LED and zener diode set;
the voltage-limiting and reverse polarity series type LED device is an integrated package composed of the two aforementioned sets of LED and zener diodes, or composed by the two aforementioned sets of LED and zener diodes in individual structures with external conductors to make reverse polarity series connection; and
the voltage-limiting and reverse polarity series type LED device further comprises:
a first connection terminal (a) connected to a first side of said first LED and diode assembly,
a second connection terminal (b) connected to a second side of said first LED and diode assembly and to a second side of said second LED and diode assembly whereby the second connection terminal (b) is connected in series to the first LED and diode assembly or the second LED and diode assembly via respective first (a) or third (c) connection terminals,
the third connection terminal (c) connected to a first side of said second LED and diode assembly, and
a first current-limiting impedance element (400) connected in series to the first (a) or third (c) connection terminals and/or a second current-limiting impedance element (401) connected in series to the first LED (101), and/or a third current-limiting impedance element (402) connected in series to the second LED (102),
wherein the reverse polarity series type LED and drive circuit functions with alternating current power when a source of said alternating current power is connected between said first and third terminals (a, c), and with a source of said direct current power or direct current power of alternating polarity when said first and third terminals (a, c) are connected together, and wherein the connections of the first and third terminals (a, c) and said second terminal (b) serve to commonly allow the direct current power or direct current power of alternating polarity to pass through said first and second LEDs (101, 102), and
wherein the reverse polarity series type LED device further comprises a first power storing and discharging device (301) connected in parallel to the first diode (201), and/or a second power storing and discharging device (302) connected in parallel to the second diode (202), wherein the power storing and discharging device includes a rechargeable battery, a unipolar or bipolar capacitance, or a super capacitance.

2. The voltage-limiting and reverse polarity series type LED device as claimed in claim 1, wherein when the alternating current power or the direct current power of alternating polarity is delivered from the conducting interface device at the terminal (a) and the conducting interface device at the terminal (c), the voltage-limiting and reverse polarity series type LED device of the present invention is operated as an alternating current LED, and during various voltage polarities, the first zener diode (501) and the second zener diode (502) provide the voltage-limiting protection for the parallel-connected first LED (101) and second LED (102); and wherein when the alternating current power or the direct current power of alternating polarity is at a first polarity status that enables operation of the second LED (102), the voltage-limiting and reverse polarity series type LED device relies on the reverse polarity diode function of the zener diode (501) to pass the electrical current through the second LED (102); and when the alternating current power or the direct current power of alternating polarity changes to a second polarity opposite to the first polarity, the voltage-limiting and reverse polarity series type LED device relies on the reverse polarity diode function of the second zener diode (502) to pass the electrical current through the first LED (101).

3. The voltage-limiting and reverse polarity series type LED device as claimed in claim 1, wherein when the terminal (a) conducting interface device connects with the terminal (c) conducting interface device, their connection terminal and the terminal (b) commonly allow the direct current to pass through LED (101) and LED (102), and the zener diode (501) and zener diode (502) commonly provide voltage-limiting protection for LED (101) and LED (102) to enable the voltage-limiting and reverse polarity series type LED device of the present invention to operate as a direct current LED.

4. The voltage-limiting and reverse polarity series type LED device as claimed in claim 1,
   wherein when functioning with the alternating current power or the direct current power of alternating polarity, the voltage-limiting and reverse polarity series type LED device is series-connected with the first current-limiting impedance element (400) between a source of the alternating current power or the direct current power of alternating polarity and the conducting interface device at terminal (a) or the conducting interface device at terminal (c) of the voltage-limiting and reverse polarity series type LED device, and/or the second current-limiting impedance element (401) is connected in series with LED (101), and/or the third current-limiting impedance element (402) is connected in series with LED (102);
   wherein the impedance elements are constituted by one or more of the following impedance elements: 1) resistive impedance elements; 2) capacitive impedance elements; 3) inductive impedance elements; 4) linear transistor impedance elements; 5) chopped wave switch type elements composed of solid state switch type elements; and 6) chopped wave switch type elements composed of thyristors; and
   wherein the series connection positions of the impedance elements include 1) the impedance elements first connect with individual LEDs in series and then connect in parallel with the respective zener diode; and/or 2) the impedance element is series-connected between the power source and the voltage-limiting and reverse polarity series type LED device; and/or 3) the respective LED and zener diode are first connected in parallel in the same working polarity and then connected in series with the impedance element.

5. The voltage-limiting and reverse polarity series type LED device as claimed in claim 2 or 3,
   wherein when functioning with the direct current power, the voltage-limiting and reverse polarity series type LED device limits the electrical current passing through the voltage-limiting and reverse polarity series type LED device further being: 1) connected in series with the first current-limiting impedance element (400) between the direct current power source and the terminal (a) of the conducting interface device and the terminal (c) of the conducting interface device of the voltage-limiting and reverse polarity series type LED device; and/or 2) connected in series with the first current-limiting impedance element (400) between the direct current power source and the terminal (b) of the conducting interface device of the voltage-limiting and reverse polarity series type LED device; and/or 3) first connected in series with the second current-limiting impedance element (401) with the first LED (101) and then connected in parallel with the first zener diode (501); and/or 4) first connected in series with the current-limiting impedance element (402) with the second LED (102) and then connected in parallel with the second zener diode (502);
   wherein the impedance elements are constituted by one or more of the following impedance elements: 1) resistive impedance elements; 2) linear transistor impedance elements; 3) chopped wave switch type elements composed of solid state switch type elements; or 4) chopped wave switch type elements composed of thyristors; and
   wherein the series connection positions of the impedance elements include 1) the impedance elements first being connected with individual LEDs in series and then connected in parallel with the respective zener diode; and/or 2) the impedance element is series-connected between the power source and the reverse polarity series connection type LED; and/or 3) the LED and the zener diode are first connected in parallel in the same working polarity and then connected in series with the impedance element.

6. The voltage-limiting and reverse polarity series type LED device as claimed in claim 1,
   wherein when functioning with the alternating current power, the first zener diode (501) is connected in parallel between terminal (a) and terminal (b), the second zener diode (502) is connected in parallel between terminal (b) and terminal (c), and both terminals of the first zener diode (501) are connected in parallel with the electricity storing and discharging device (301) and/or both terminals of the second zener diode (502) are connected in parallel with the electricity storing and discharging device (302), and during delivery of the alternating current power, when the polarity of the supplied alternating current power source is such that power is supplied to the parallel-connected LED, and the power supply voltage is higher than the voltage of its parallel-connected electricity storing and discharging device, the power source simultaneously supplies power to the LED and charges the parallel-connected electricity storing and discharging device; while when the polarity of the alternating current power source is such that no power is supplied to the parallel-connected LED or when the power supply voltage is lower than the voltage of the electricity storing and discharging device, the electricity storing and discharging device supplies power to the parallel-connected LED; and
   wherein by means of the operation of the electricity storing and discharging device, the following partial or complete functions are attained: 1) two LEDs deliver power and emit light without being affected by the polarity changes of the alternating current power source; 2) when the alternating current power source drives the respective LED, optical pulsation of the LED is reduced; 3) delay electric energy is provided for the respective LED when power is cut off; 4) the electricity storing and discharging device serves as the power supply to allow continuous lighting of LEDs during an emergency power shutdown.

7. The voltage-limiting and reverse polarity series type LED device as claimed in claim 6, the second current-limiting impedance element (401) is connected in series with diode (203), and then through the current input terminal of diode (203) and the current output terminal of the first LED (101) such that it assumes the same working current flow and connects in parallel with zener diode (501) in order to protect the first LED (101), zener diode (501) being connected in parallel to terminal (a) and terminal (b); and/or a third current-limiting impedance element (402) is series-connected to the second LED (102), and according to the direction of light-emitting current of the second LED (102), the third current-limiting impedance element (402) is connected in series to the second diode (204), and then through the current input end of the second diode (204) and the current output end of the second LED (102), it assumes the same current flow and connects in parallel with zener diode (502) in order to protect the second LED (102) zener diode (502) being connected in parallel connection to terminal (b) and terminal (c); a power storing and discharging device (301) is connected in parallel between the jointly-connected first diode (203) and the second current-limiting impedance element (401) and the current output terminal of the first LED (101), and/or a power storing and discharging device (302) is connected in parallel between the jointly connected second diode (204) and the third current-limiting impedance element (402) and the current output terminal of the second LED (102); wherein when polarities of the respective diodes and impedance elements during the delivery of alternating current power are such that they assume a power supply status with respect to the LED with which they are connected in parallel; and the power supply voltage is higher than the voltage of its parallel-connected power storing and discharging device, the power source simultaneously supplies power to the respective LED and charges the power storing and discharging device with which it is connected in parallel; and wherein when the polarities of the alternating current power supply are such that no power is supplied to its parallel-connected LED; and the power supply voltage is lower than the voltage of the power storing and discharging device, the power storing and discharging device will supply power to the LED with which it is connected in parallel; and wherein by means of the operation of the electricity storing and discharging device, the following partial or complete functions are attained: 1) two LEDs deliver power and emit light without being affected by the polarity changes of the alternating current power source; 2) when the alternating current power source drives the respective LED, optical pulsation of the LED is reduced; 3) delay electric energy is provided for the respective LED when power is cut off; 4) the electricity storing and discharging device serves as the power supply to allow continuous lighting of LEDs during an emergency power shutdown.

8. The voltage-limiting and reverse polarity series type LED device as claimed in claim 6 or 7, wherein when the voltage-limiting and reverse polarity series type LED device functions with alternating current power and is connected in parallel with the electricity storing and discharging devices, the first current-limiting impedance element (400), the second current-limiting impedance element (401), and the third current-limiting impedance element (402) are not installed.

9. The voltage-limiting and reverse polarity series type LED device as claimed in claim 6 or claim 7, wherein the first zener diode (501) connected in parallel between terminal (a) and terminal (b) of the voltage-limiting and reverse polarity series type LED device, and/or the second zener diode (502) connected in parallel with terminal (b) and terminal (c) of the voltage-limiting and reverse polarity series type LED device, are installed in parallel with LED (101) and/or LED (102), or installed at both locations.

10. The voltage-limiting and reverse polarity series type LED device as claimed in claim 1,
further comprising a third diode (601) and a fourth diode (602): composed of rectifying diodes, wherein the third diode (601) is parallel connected in reverse polarity to two ends of the plural series-connected or series-parallel connected first LED (101), the fourth diode (602) is served to be parallel connected in reverse polarity to two ends of the plural series-connected or series-parallel connected second LED (102).

11. The voltage-limiting and reverse polarity series type LED device as claimed in claim 1, wherein the zener diodes which provide the voltage-limiting protection for the LEDs of the voltage-limiting and reverse polarity series type LED device are replaceable with circuit devices that include semi-conducting elements and devices and machine electronics with voltage-limiting effects and reverse polarity conduction.

12. The voltage-limiting and reverse polarity series type LED device as claimed in claim 1, wherein the specifications for power, voltages, currents and numbers as well as the series or parallel or series-parallel connections of LED (101) and LED (102) are the same, with or different from each other; the colors of lights emitted by the energized LED (101) and LED (102) are the same with or different from each other.

13. The voltage-limiting and reverse polarity series type LED device as claimed in claim 6 or claim 7, wherein types and specifications of the first current-limiting element (400) and/or the second current-limiting element (401) and/or the third current-limiting element (402) are the same as or different from each other; the first current-limiting impedance element (400) and/or the second current-limiting impedance element (401) and/or the third current-limiting impedance (402) are fixed impedances, adjustable impedances, chopper controlled, or linear controlled in order to simultaneously or separately control LED light adjustments to the first LED (101) and the second LED (102).

14. The voltage-limiting and reverse polarity series type LED device as claimed in claim 6 or 7, wherein the types and specifications of the electricity storing and discharging device (301) and/or the electricity storing and discharging device (302) are the same as or different from each other.

15. The voltage-limiting and reverse polarity series type LED device as claimed in claim 1, wherein the types and specifications of the zener diode (501) and zener diode (502) are the same as or different from each other.

16. The voltage-limiting and reverse polarity series type LED device as claimed in claim 3, 4, 6, or 7 whereof the structural modes include:
a) the individual elements that constitute the voltage-limiting and reverse polarity series type LED device are independent structures; the external connections and individual elements rely on conducting interface devices such as conduction terminals, and/or conducting wire, and/or electrical conductors, and/or plugs, and/or sockets to connect or solder or lock for connections; and/or b) two or more individual elements form an integrated package and conducting interface devices are installed; the external connections and individual elements of other parts rely on conducting interface devices such as conduction terminals, and/or conducting wire, and/or electrical conductors, and/or plugs, and/or sockets to connect or solder or lock for connections; and/or c) the first LED and zener diode set is an integrated package and conducting interface devices are installed; the second LED and zener diode set is an integrated package and conducting interface devices are installed; between them, conducting interface devices such as conduction terminals, and/or conducting wire, and/or electrical conductors, and/or plugs, and/or sockets make connections or solder or lock for connections; and/or d) the whole voltage-limiting and reverse polarity series type LED device is integrated into a single package; conducting interface devices such as conduction terminals, and/or conducting wire, and/or electrical conductors, and/or plugs, and/or sockets are installed to make external connections or methods such as soldering or locking are used for external connections.

\* \* \* \* \*